United States Patent [19]
Matherne

[11] 3,783,906
[45] Jan. 8, 1974

[54] APPARATUS FOR WELDING VERTICAL MEMBERS DURING INCLEMENT WEATHER

[76] Inventor: Lee J. Matherne, 2717 W. Main St., Houma, La. 70360

[22] Filed: June 23, 1972

[21] Appl. No.: 265,675

[52] U.S. Cl. .................. 138/103, 138/89, 29/488, 135/5, 219/72, 228/57
[51] Int. Cl. ............................................. F16l 55/00
[58] Field of Search ............... 29/488, 494; 219/72; 135/1 R, 5 R, 8; 138/89, 103; 228/57

[56] References Cited
UNITED STATES PATENTS

| 244,058 | 7/1881 | Hoek | 135/5 R X |
|---|---|---|---|
| 2,004,668 | 6/1935 | McAuliffe | 135/5 R |
| 2,713,889 | 7/1955 | White | 135/5 R X |
| 3,195,943 | 7/1965 | Taylor et al. | 135/8 X |
| 3,452,764 | 7/1969 | Bell | 135/5 R X |
| 3,529,427 | 9/1970 | Titman | 61/1 R X |
| 3,540,170 | 11/1970 | Flowers | 135/1 R X |
| 3,643,673 | 2/1972 | Weber | 135/20 R |

Primary Examiner—J. Spencer Overholser
Assistant Examiner—Ronald J. Shore
Attorney—Clarence A. O'Brien, Harvey B. Jacobson

[57] ABSTRACT

A canopy for mounting on the external surface of the upper member of a pair of vertically aligned and abutting members to protect the juncture area between the members while being butt welded to protect the weld from rain, snow, hail, sleet and the like which causes crystallization of the heated metal due to rapid cooling of certain areas when contacted by rain and the like. The vertical members are pipes such as employed in oil wells such as conductor pipes, casings and the like with the upper end of the upper pipe being provided with a closure cap to prevent entry of rain and the like into the interior of the pipe thereby protecting both the interior and exterior of the pipes to enable effective continuance of the welding operation and installation of the pipe into the oil well during periods of inclement weather. In practicing the method and employing the apparatus, any residual moisture on the pipe is quickly dried due to the heat generated by the welding operation and the canopy is sealed to the external periphery of the upper pipe above the juncture area and is of sufficient dimension to enable normal welding operations thereby eliminating the necessity of shutting down operations during periods of rain, hail, sleet, snow and the like.

7 Claims, 11 Drawing Figures

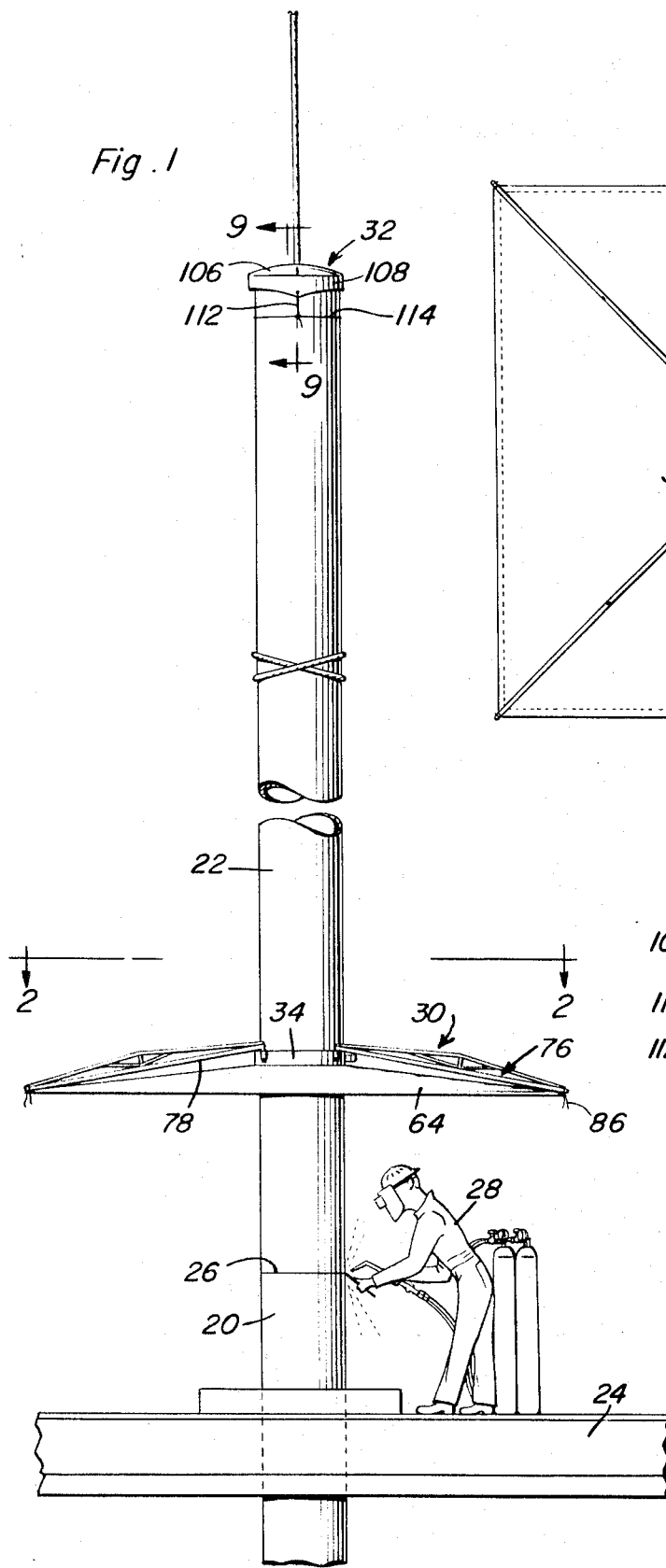
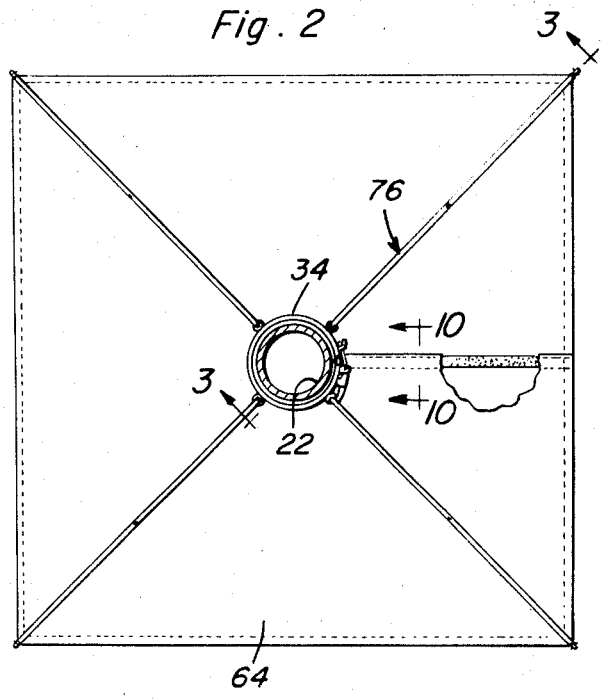
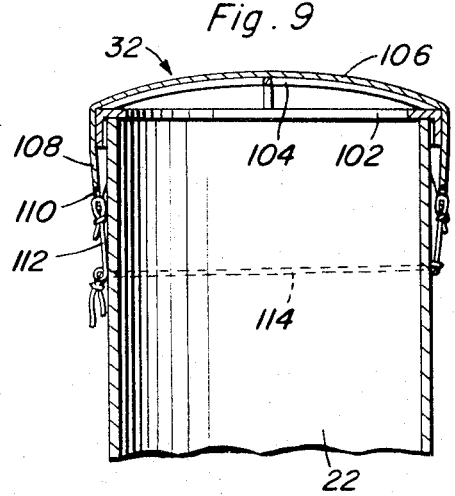
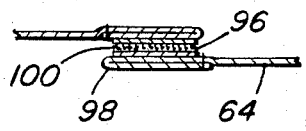

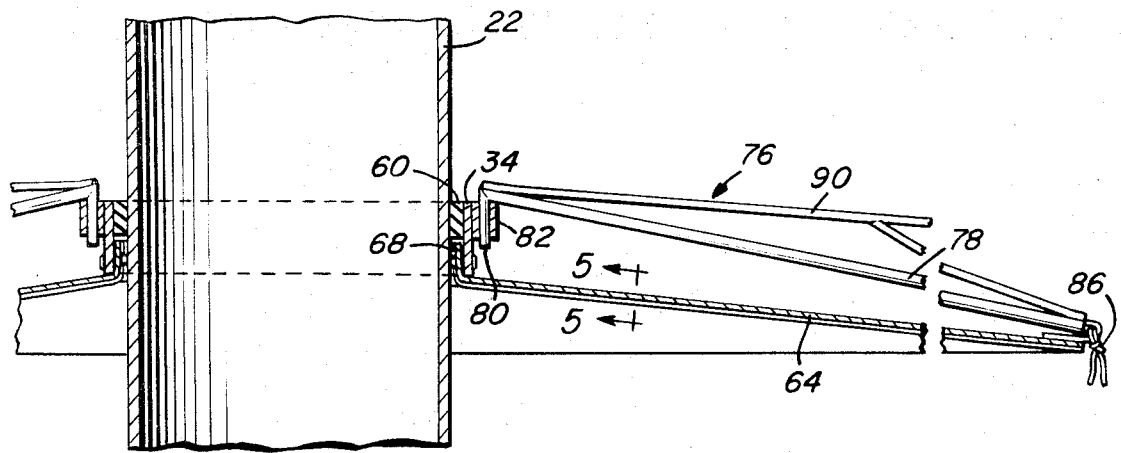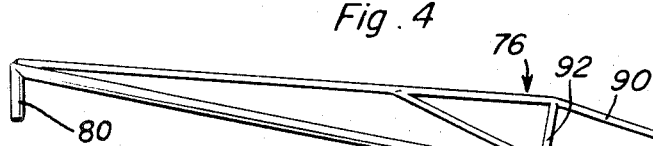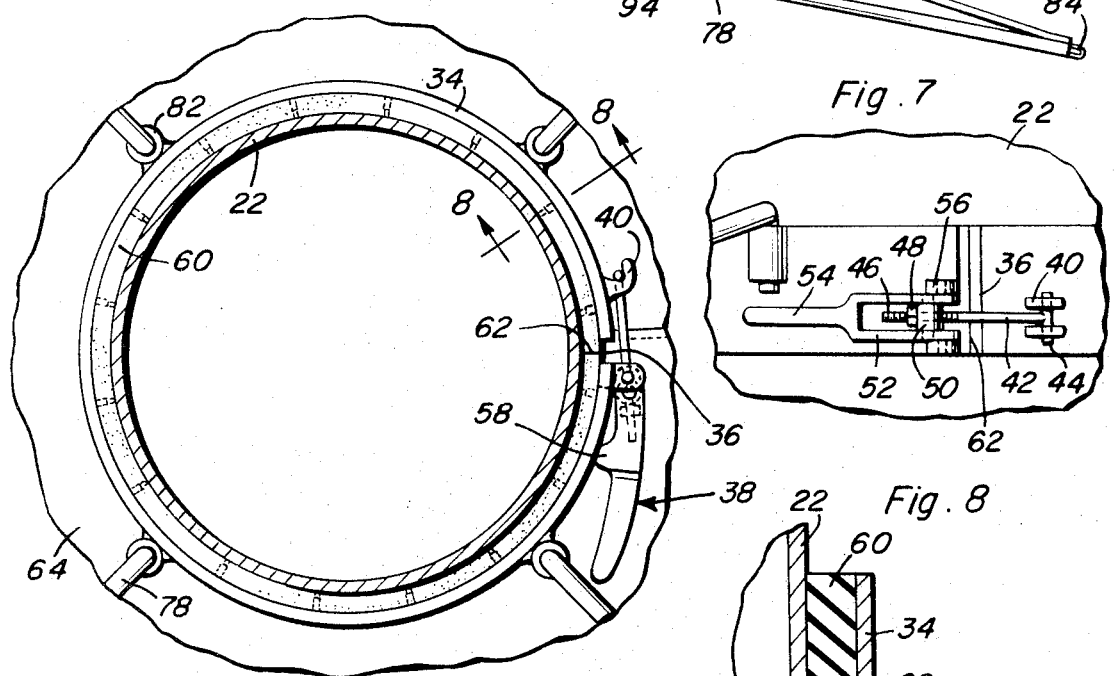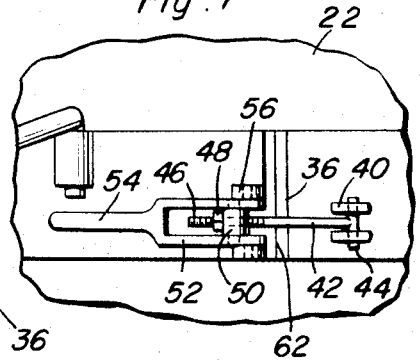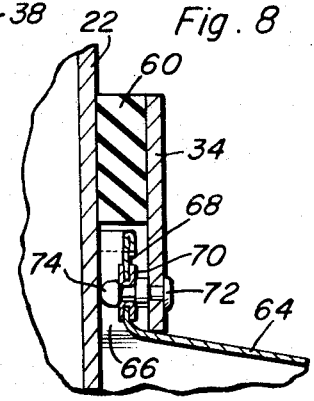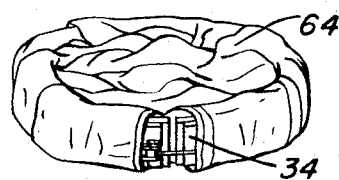

APPARATUS FOR WELDING VERTICAL MEMBERS DURING INCLEMENT WEATHER

BACKGROUND OF THE INVENTION

1. Field of the Invention

The present invention generally relates to the installation of vertical pipe sections in an oil well by welding the pipes when an upper pipe is aligned with a pipe already in the well and is butt welded thereto. The apparatus and method of the present invention provide protection of the juncture area between the pipes from rain and the like and enables the welding operation to be effectively continued during periods of inclement weather.

2. Description of the Prior Art

Welding of pipe sections when they are being run into an oil well or the like is a well known technique in the industry. However, this procedure cannot be continued during periods of rain inasmuch as water drops coming into contact with the welding juncture between the pipes causes uneven cooling, crystallization and otherwise adversely affects the welded joint. Thus, it is normal procedure to shutdown the operation during periods of inclement weather thereby obviously introducing inefficiencies and added costs due to the idle periods of the equipment.

While many efforts have been made previously to provide temporary shelters for areas in which various procedures are being conducted for protection of such areas, the welding of vertically aligned members which are welded together and subsequently run into the well bore present problems which have not been solved by previous protective shelters and the like.

SUMMARY OF THE INVENTION

An object of the present invention is to provide a method of protecting vertically aligned pipes so that they can be welded togehter during inclement weather without adverse affect and without shutting down the operation.

Another object of the invention is to provide a device in the form of an external canopy sealed peripherally to and extending radially from the external surface of the upper pipe member of a pair of aligned pipes together with a closure cap for the upper end of the upper pipe of two aligned pipes thereby protecting both the inner surface of the welded juncture area and the external surface thereof.

A further object of the invention is to provide a protective device in accordance with the preceding object incorporating a split ring with a quick acting clamp device and a seal structure internally thereof for engagement with the periphery of the pipe together with a novel arrangement of radially extending supporting assemblies for the flexible canopy which, in itself, is provided with novel connection with the clamp ring and the supporting assemblies together with a radial overlapping joint that can be separated to facilitate storage in a compact condition when not in use.

Yet a further object of the present invention is to provide a protective device in accordance with the preceding objects which is easy to assemble and use, effective for protecting the welded joint during the welding operation, inexpensive to manufacture an ruggedly constructed to withstand conditions that would be encountered during adverse weather conditions.

These together with other objects and advantages which will become subsequently apparent reside in the details of construction and operation as more fully hereinafter described and claimed, refernece being had to the accompanying drawings forming a part hereof, wherein like numerals refer to like parts throughout.

BRIEF DESCRIPTION OF THE DRAWINGS

FIG. 1 is a side elevational view illustrating the protective canopy and closure cap of the present invention associated with the upper pipe member of a pair of vertically aligned pipe members for protecting the welded joint and welder during the formation of a butt weld between the pipe members.

FIG. 2 is a transverse, plan sectional view taken substantially upon a plane passing along section line 2—2 of FIG. 1 illustrating the structural details of the canopy.

FIG. 3 is a vertical sectional view taken substantially upon a plane passing along section line 3—3 of FIG. 2 illustrating the specific structural details of the clamp ring, canopy and canopy support assemblies.

FIG. 4 is a perspective view of one of the canopy support assemblies.

FIG. 5 is a detailed sectional view taken substantially upon a plane passing along section line 5-5 of FIG. 3 illustrating the radial seams employed in the canopy.

FIG. 6 is a detailed plan view of the clamp ring, on an enlarged scale, illustrating the association of the canopy with the pipe.

FIG. 7 is a fragmental elevational view illustrating the quick acting clamp for the clamp ring.

FIG. 8 is a detailed sectional view taken substantially upon a plane passing along section line 8—8 of FIG. 6 illustrating further structural details of the clamp ring and the manner of attaching the canopy thereto.

FIG. 9 is a vertical sectional view taken substantially upon a plane passing along section line 9—9 of FIG. 1 illustrating further structural details for the closure cap for the upper end of the upper pipe.

FIG. 10 is a detailed sectional view taken substantially upon a plane passing along section line 10—10 of FIG. 2 illustrating the construction of the overlapping joint in the canopy.

FIG. 11 is a perspective view illustrating the manner in which the flexible canopy material may be stored within the ring during periods of non-use.

DESCRIPTION OF THE PREFERRED EMBODIMENT

Referring now specifically to the drawings, the device of the present invention is disclosed associated with a pair of vertically disposed pipes 20 and 22 with the pipe 20 already being inserted into an oil well through a platform 24 in a well-known manner and supported in a well-known manner so that the welding operation can be effectively conducted.

As illustrated in FIG. 1, a butt weld 26 is being formed by a welder 28 standing on the platform 24 in a well-known manner so that the pipes 20 and 22 will be properly joined. This operation is conventional in the industry but when it is raining, it is impossible to continue the welding operation inasmuch as raindrops hitting the weld area or juncture area cause uneven and rapid cooling of certain areas of the weld thus adversely affecting the strength characteristics of the weld. In order to overcome the problem of shutting down the welding operation and installation of the pipe or casing in the well during periods of inclement weather, a canopy generally designated by numeral 30 and a closure cap generally designated by the numeral 32 are provided both of which are mounted on the upper pipe 22 as illustrated in FIG. 1 with the closure cap preventing entry of rain into the interior of the pipes and the canopy protecting the exterior of the juncture area as well as the welder. The closure cap 32 is placed on the upper end of the pipe 22 when it is being lifted from the rack normally provided for the pipe sections and the canopy is placed thereon after it has been oriented in vertical position with the canopy 30 being disposed sufficiently above the platform 24 to enable normal welding operations and having sufficient lateral dimension to effectively protect the juncture area in which the butt weld 26 is to be made.

The canopy 30 includes an annular split ring 34 of cylindrical configuration generally of the same diameter as the pipe 22 but provided with a space 36 between adjacent ends to enable the ring to be collapsed into clamping engagement with the pipe 22 by a quick-acting clamp mechanism generally designated by the numeral 38 and which includes a hook type member 40 rigidly fixed to one end portion of the ring 34 as illustrated in FIGS. 6 and 7 with the hook member 40 actually being defined by two vertically spaced hooks which open away from the space 36. A T-shaped actuating rod 42 having a transverse rod member 44 on the end thereof removably engaging the hooks 40. The other end of the rod 42 is threaded at 46 and receives a nut 48 thereon with the threaded portion 46 of the rod extending through a transverse member 50 that is rotatably received between the bifurcated legs 52 on an actuating handle 54 for the clamp mechanism 38. The legs 52 of the handle 54 are pivotally mounted between lugs 56 on the end of the clamp ring adjacent the space 36 opposite to the hooks 40 with the pivot axis of the legs being spaced from the pivot axis of the member 50 so that when the handle 54 is pivoted outwardly from the position of FIG. 6, the actuating rod 42 will be loosened thus unclamping the clamp ring and enabling disengagement of the rod 42 from the hooks. When clamping the ring to the pipe 22, the handle 54 will be disposed in an outward position so that the rod 44 may be engaged with the hooks 40 after which the handle 54 is moved inwardly thus providing a quick-acting mechanism for clamping the clamp ring 34 to the pipe 22. A limit or stop member 58 is provided on the handle for limiting its inward pivotal movement so that the center of rotation of the transverse member 50 will be located inwardly of the tangential plane of the pivot axis for the legs 48 thereby providing a quick-acting over-center clamp.

The inner surface of the clamp ring 38 is provided with a seal member 60 attached thereto such as by a suitable adhesive or the like with the seal member having a slit 62 therein in registry with the space 36 so that the seal member will be continuous around the periphery of the pipe 22 thereby providing a weather-tight seal for the clamp ring 34 with the seal member being constructed of rubber, neoprene or other suitable resilient, water-impervious material that is sufficiently flexible to open up with the split ring to enable it to be installed and removed laterally in relation to the pipe. As illustrated in FIGS. 3 and 8, the seal member 60 has its upper surface substantially flush with the upper edge of the ring 34 and the bottom surface of the seal member 60 is spaced upwardly from the bottom edge of the ring 34 thereby providing an annular space between the lower portion of the ring 34 and the external surface of the pipe 22.

A flexible water-impervious member 64 has a central opening 66 defined by an upstanding flange 68 terminating in a reversely folded hem at it upper edge and provided with a plurality of grommets 70 therein. The flange 68 extends upwardly into the space between the lower edge portion of the ring 34 and the pipe 22 as illustrated in FIG. 8. The grommets 70 are received on inwardly extending studs 72 rigid with the lower portion of the ring 34 and provided with twist lock devices 74 on the inner end thereof which extend through the grommets 70 and lock the grommets to the studs 72 by twisting the twist locks 74 into a perpendicular relation to the major axis of the grommets which are of oval-shaped configuration thereby detachably securing the flexible canopy member 64 to the ring 34 and providing a weatherproof connection inasmuch as any rain running down around the outside of the ring 34 will engage the flexible canopy 64 and run downwardly along the upper surface thereof which is inclined downwardly towards the outer peripheral edge. No rain can penetrate around the upwardly extending flange portion of the flexible canopy member 64.

As illustrated in FIG. 2, the flexible canopy member 64 is of square configuration but it is pointed out that any suitable shape may be employed. For supporting the flexible canopy member 64, a plurality of radially extending support assemblies 76 (see FIG. 4) are provided each of which includes an elongated rod or pipe 78 having an acutely angled depending mounting rod 80 at its inner end which is telescopically and releasably received in one of a plurality of sleeves 82 welded to the outer surface of the clamp ring 34. The outer end of the supporting rod 78 is provided with a rigid loop 84 to which the outer perimeter of the flexible canopy member 64 is attached by tie strings 86 oriented at the corners of the flexible member 64 and attached to the flexible member 64 in any suitable manner. The flexible member 64 is provided with a peripheral reinforcing hem at the edge thereof and a plurality of folded seams 88 extending radially from the central opening 66 to the corners thereof with the structure of the seams being illustrated in FIG. 5 and with the seams reinforcing that area in which tension is applied to the flexible member 64 by engagement of the tie strings 86 with the loop 84. Thus, the flexible member 64 will be retained in taut condition with the peripheral edge thereof spaced downwardly from the flange 68 and the supporting assembly 76 being generally downwardly inclined for supporting the flexible member 64 in a taut condition without any rigid stiffening rods or other framing structure for the member 64 so that it can be folded into a compact condition when it is not in use by disconnecting the tie strings 86 from the supporting assemblies and disconnecting the flange 68 from the ring 34 by the twist locks 74 or the flange 68 may be left attached to the ring 34 and the peripheral portion of the flexible mmeber 64 gathered together and positioned interiorly of the ring so that a rather compact arrangement is provided for storage such as illustrated in FIG. 11.

Depending upon the dimensions of the flexible member 64 and the forces which may be encountered, the supporting assembly may include a truss assembly including upwardly inclined tension members 90 in the form of rods, pipes or the like which are fixed to the outer ends of the member 78 which becomes a compression member with the apex of the members 90 being connected to the center of the member 78 by a member 92 perpendicular to the rod 78. Brace members 94 may be provided between the point of juncture between the member 98 and the member 92 and an intermediate portion of the tension members 90. The four supporting assemblies 76 may be readily removed from the ring 34 and stored alongside of each other when not in use thus providing a compact storage asembly for the protective canopy. Also, as illustrated in FIG. 8, the inner ends of the twist locks 74 will engage the outer surface of the pipe 22 to assure that the ring 34 will be disposed substantially concentric with the pipe 22 and eliminate any tendency of the ring to tilt or cant in relation to the pipe 22 thereby assuring that the seal member 60 will be rendered effective. Also, to facilitate installation of the flexible member 64, a radial slit-like opening 96 is provided from the center of one peripheral edge portion thereof to the upper edge of the flange with this opening being aligned with the space 36 in the ring 34 and the slit 62 in the seal member 60. The radial opening is defined by overlapping edges 98 that are detachably secured together by fastener strips 100 such as that sold under the trade-mark "Velcro." This provides an effective closure which can be easily opened and closed and still maintain weather-tight characteristics. Other types of detachable connectors may be employed for retaining the flaps 98 in overlapping and releasable condition.

The closure cap 32 includes an annular ring 102 of right-angular cross-sectional configuration and which includes a horizontal flange resting against the top edge of the pipe 22 and a depending vertical flange that telescopes downwardly over the outer edge surface of the upper end of the pipe 22. Rigidly connected to the ring 102 is a pair of upwardly bowed diametrically extending rods 104 which intersect in the middle and generally define a dome-shaped frame that is detachably supported on the upper end of the pipe 22. Overlying the frame defined by the ring 102 and the rods 104 is a flexible cover 106 of water-impervious material which is engaged with the upper surface of the dome-shaped frame defined by the rods 104 so that any rain will be shed off of the peripheral edges of the cover 106 thus preventing rain from entering the upper end of the pipe 22. For securing the cover 106 in place, the peripheral edge 108 thereof is provided with apertures or grommets 110 having depending tie strings 112 attached thereto which in turn are connected with an anchor string or rope 114 encircling the pipe 22 thus facilitating mounting of the cap on the pipe 22. If desired, the anchor member 114 may be in the form of a resilient strap so that the frame may be initially positioned on the upper end of the pipe 22 and the cap slid into position thereon by stretching the resilient member so that the upper end of the cover engages the dome-shaped frame. This also enables removal of the cover and frame without disconnecting tie strings and the like.

With this construction, the closure cap is placed on the end of the pipe which is picked up by the lifting mechanism as the pipe is being removed from the pipe rack and after the pipe has been installed into its vertical position, the canopy 30 may be quickly installed. Even though the pipe may be wet due to rain coming into engagement therewith while on the pipe rack, the welding operation can continue since the heat produced by the welding torch will quickly dry the juncture area between the pipes 20 and 22. The closure cap 32 prevents entry of rain into the interior of the pipes and the canopy 30 will protect the welding area and prevent any water from running down the exterior of the pipe and also prevent rain, snow, sleet or the like from coming into contact with the external surface of the juncture area between the pipes 20 and 22. Various shapes and configurations of canopies may be employed and in some instances, the peripheral edge portions, corners or the like of the canopy could be anchored to railing or other components of the platform for support thereof and the open area under the canopy will eliminate any possible adverse affects of any noxious gases which may be formed during the welding operation. Various flexible materials may be employed for the cover 106 and the flexible member 64 such as canvas, plastics or the like which may be either opaque or light transmitting with the material being relatively rugged in construction for an extended useful life. The use of this invention eliminates shutdown of the rig during periods of inclement weather thereby rendering the running in of the pipe sections more efficient and reducing the over-all cost of this operation.

Variations in structure may be employed depending upon the size requirements involved. For example, if a pipe or casing 36 inches in diameter is being welded and the overhang of the canopy is relatively large, a clamp bolt may be employed for more securely mounting the ring in position in lieu of the over-center clamp device. Other similar variations may, of course, be incorporated into the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for use in protecting the juncture area between two vertically aligned members being welded comprising a protective canopy adapted to extend peripherally of and radially from the members above the juncture area, and means adapted to mount the canopy from the members in sealed relation thereto whereby the canopy protects the exterior surface of the juncture area to permit welding during periods of rain or other inclement weather without the rain coming into contact with the welded area, the members being welded together being pipes that are being butt welded as they are run into an oil well or the like, and means forming a closure for the upper end of the upper pipe to prevent entry of rain into the interior of the pipes thus protecting both the exterior and interior surface of the juncture area, said means to mount the canopy including a split clamp ring, a seal member on the inner surface of the ring, said canopy including a central opening defined by an upwardly extending flange, and means mounting said flange to the interior of said ring in underlying relation to the seal member to prevent rain from running down the exterior surface of the upper pipe to the juncture area.

2. The structure as defined in claim 1 wherein said closure means for the upper end of the upper pipe includes a flexible water-impervious cover member telescoped over and secured to the upper end of the upper pipe.

3. The structure as defined in claim 2 together with a dome-shaped, open frame supporting the central portion of the cover member, said frame including an annular ring telescopically mounted on the upper end of the upper pipe.

4. The structure as defined in claim 1 wherein said canopy includes a plurality of radially extending supporting assemblies disposed above the canopy, and means on said clamp ring detachably supporting said supporting assemblies thereon.

5. The structure as defined in claim 4 wherein said canopy includes a flexible water-impervious member having a central opening defined by said upwardly extending flange, said means mounting the flange to the ring including a plurality of inwardly extending studs on the bottom edge portion of the ring, said flange including a plurality of grommets received on the studs, lock means on the inner free ends of the studs for securing the grommets thereon, the inner ends of the studs and lock means thereon engaging the external surface of the pipe for retaining the ring in concentric relation thereto, said seal member being disposed between the upper portion of the ring and the periphery of the pipe.

6. The structure as defined in claim 5 wherein each supporting assembly is in the form of a radially extending rigid member having an acutely angled downwardly extending mounting rod at the inner end thereof, said means mounting the supporting assemblies on the ring including a plurality of vertically disposed sleeves rigid with the exterior of the ring for telescopically receiving the mounting rod on the supporting assemblies, and means on the outer end of each supporting assembly for detachably supporting a peripheral portion of the flexible canopy member.

7. The structure as defined in claim 6 wherein said flexible canopy member is provided with a radially extending entrance slit defined by overlapping flaps to enable lateral assembly and disassembly of the canopy with respect to the pipe, and means detachably securing the overlapping flaps together in water-tight relation.

* * * * *